(No Model.) 6 Sheets—Sheet 1.

A. G. LEONARD.
DEVICE FOR UNITING CARS.

No. 543,030. Patented July 23, 1895.

Attest:
C. W. Benjamin
W. Jacobsen

Inventor,
Arthur G. Leonard.
by Joseph L. Levy
atty (No Model.) 6 Sheets—Sheet 2.

A. G. LEONARD.
DEVICE FOR UNITING CARS.

No. 543,030. Patented July 23, 1895.

Attest,
C. W. Benjamin
W. Jacobsen

Inventor,
Arthur G. Leonard.
by Joseph L. Levy
Atty (No Model.) 6 Sheets—Sheet 3.

A. G. LEONARD.
DEVICE FOR UNITING CARS.

No. 543,030. Patented July 23, 1895.

Attest,
C. W. Benjamin
W. Jacobsen.

Inventor,
Arthur G. Leonard,
by Joseph L. Levy
Atty

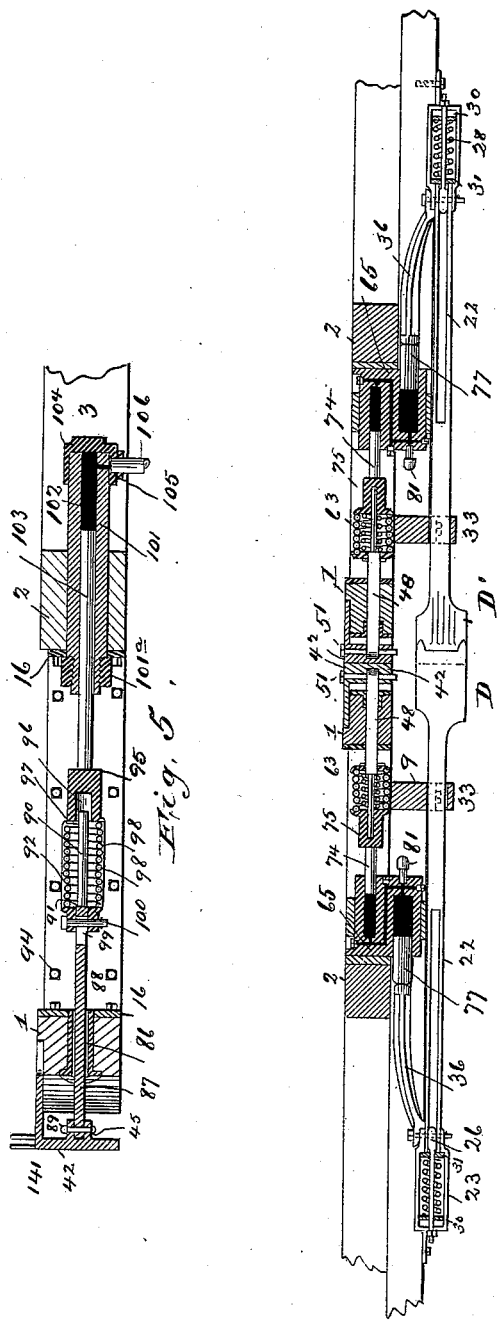

(No Model.) 6 Sheets—Sheet 5.

A. G. LEONARD.
DEVICE FOR UNITING CARS.

No. 543,030. Patented July 23, 1895.

Attest:
C. W. Benjamin
W. Jacobsen

Inventor:
Arthur G. Leonard.
by Joseph L. Levy
atty (No Model.) 6 Sheets—Sheet 6.
A. G. LEONARD.
DEVICE FOR UNITING CARS.
No. 543,030. Patented July 23, 1895.
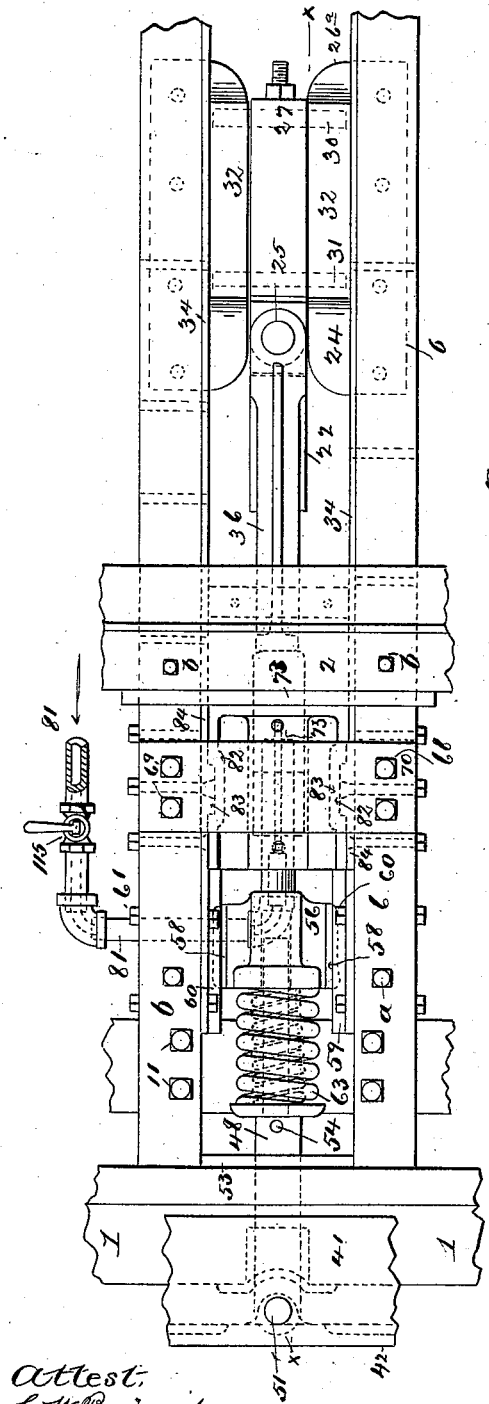
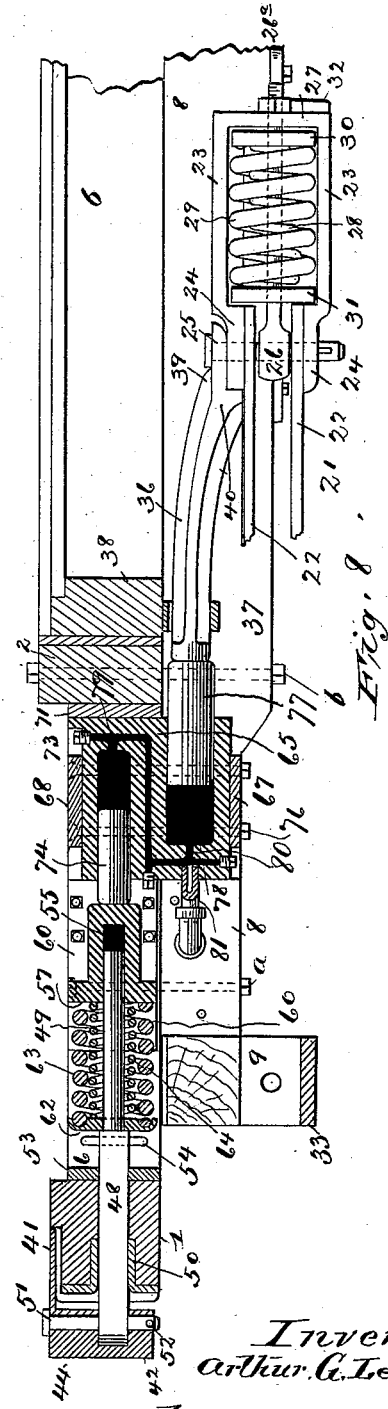

UNITED STATES PATENT OFFICE.

ARTHUR G. LEONARD, OF NEW YORK, N. Y.

DEVICE FOR UNITING CARS.

SPECIFICATION forming part of Letters Patent No. 543,030, dated July 23, 1895.

Application filed July 10, 1893. Serial No. 480,014. (No model.)

*To all whom it may concern:*

Be it known that I, ARTHUR G. LEONARD, a citizen of the United States, residing in the city, county, and State of New York, have made certain new and useful Improvements in Devices for Uniting Cars, of which the following is a specification.

My invention relates to the uniting of cars for steam-railroads, but the same can be advantageously used on the cars of street-railroads and the like.

My invention is designed to greatly increase the safety of railway-trains by making the union an exceedingly firm one, as well as one whereby the car-bodies are held in their proper relative positions much more securely than by any previous system.

My invention resides in the employment of a friction-plate, springs, cylinders, and plungers co-operating with the friction-plate, and a hydraulic system comprising a tank, a force-pump, and piping connecting the tank, pump, and cylinders, by means of which the friction-plate can be projected against a friction-plate on an opposing car with great pressure, the springs compressed and this condition mainained during all the evolutions of the car in unning, and the springs backed up by the action on the plungers of a column of inelastic or substantially inelastic liquid.

My invention also resides in the employment of the same devices in connection with the draw-bar.

My invention further resides in the construction and combination of parts hereinafter to be described, and further pointed out in the claims.

Figure 1:
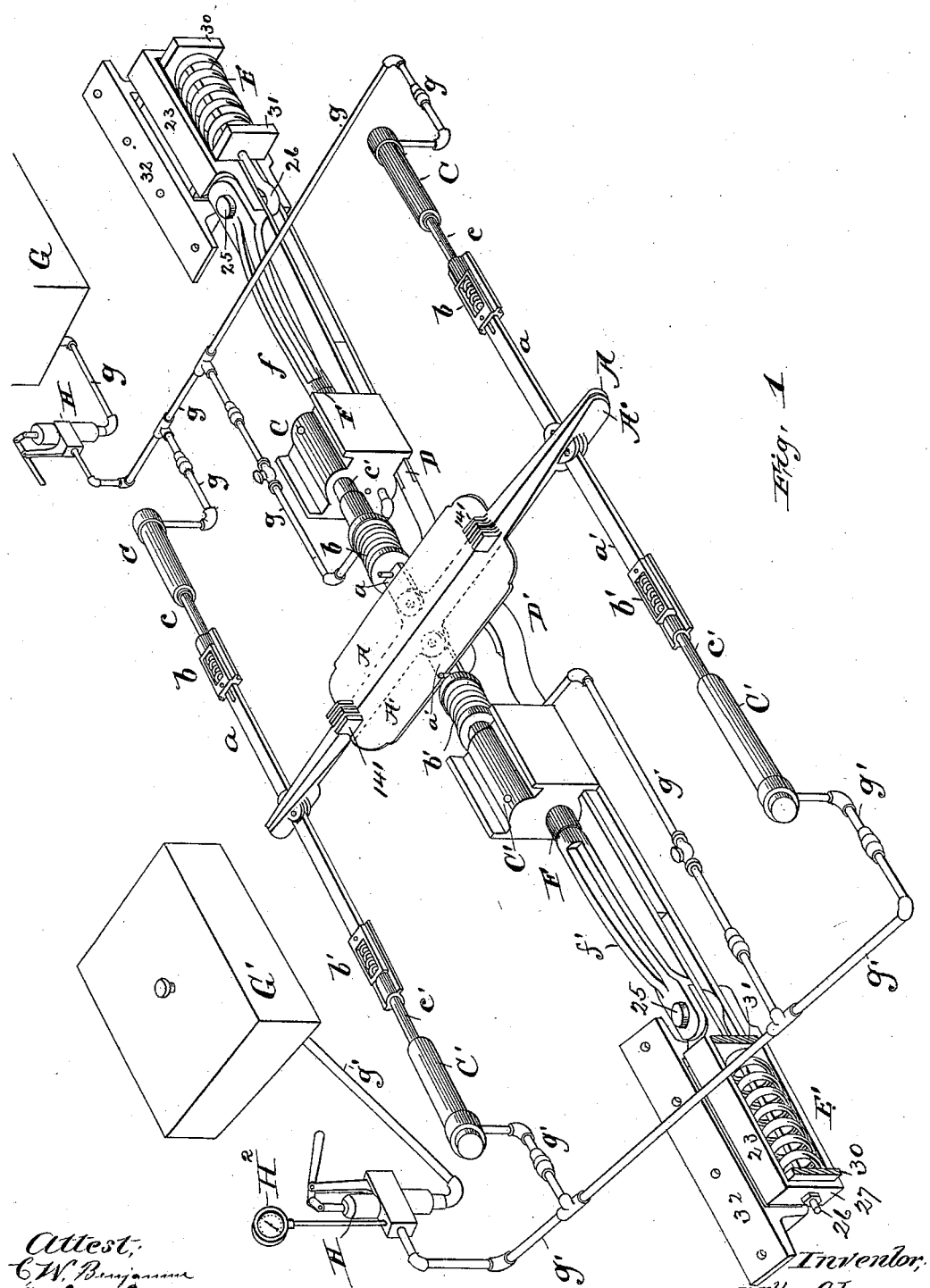
Figure 2:
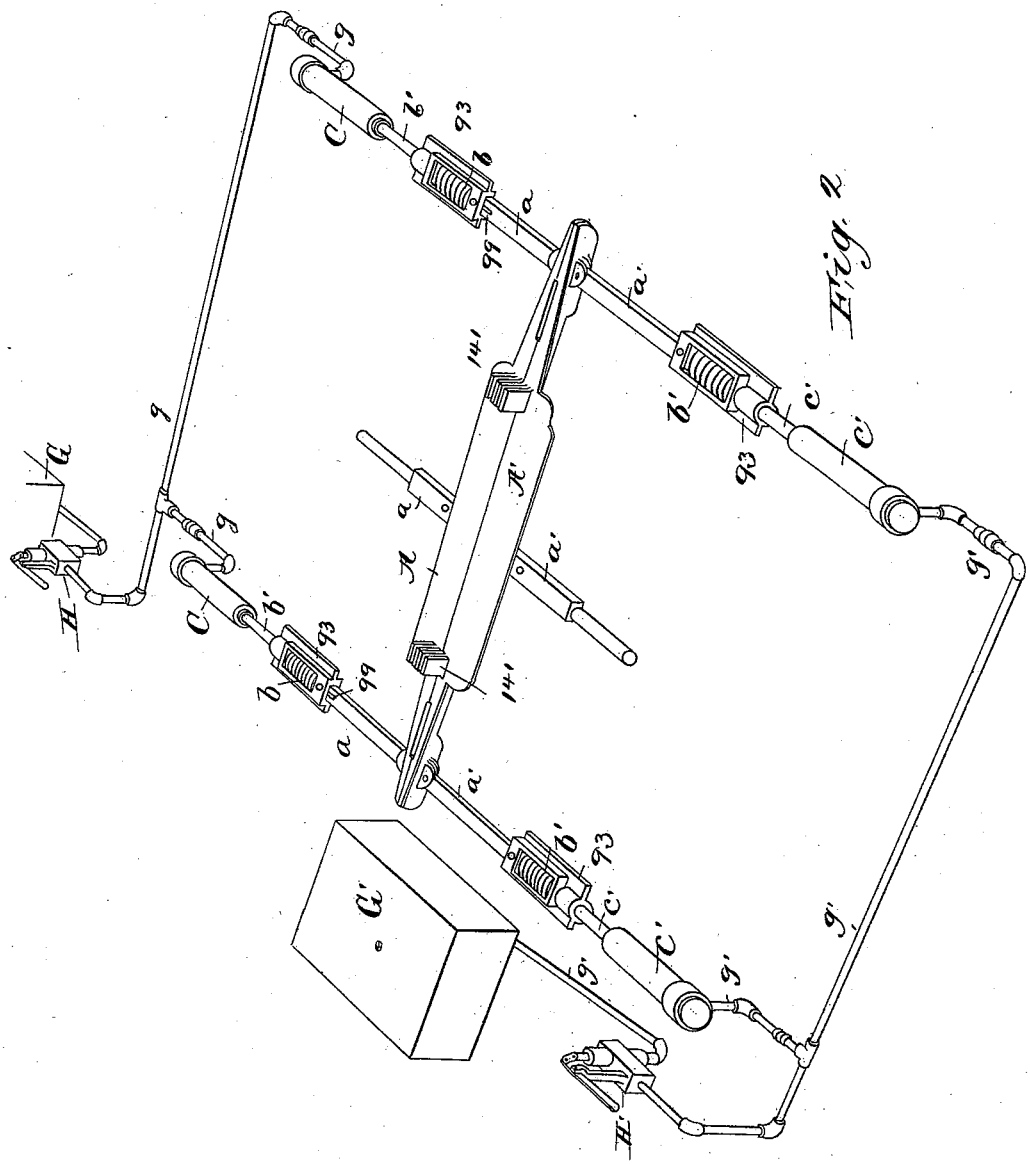
Figure 3:
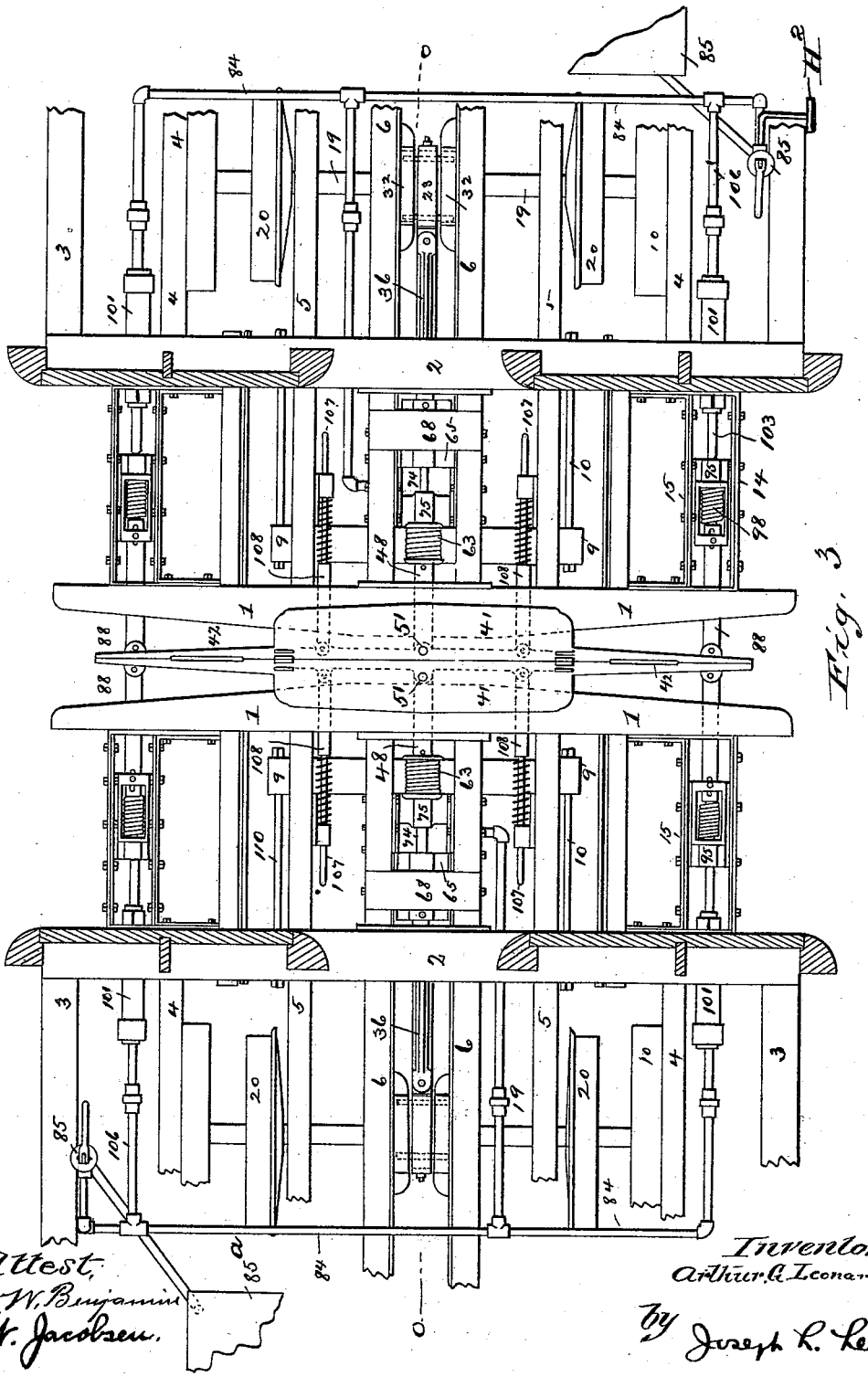
Figure 6:
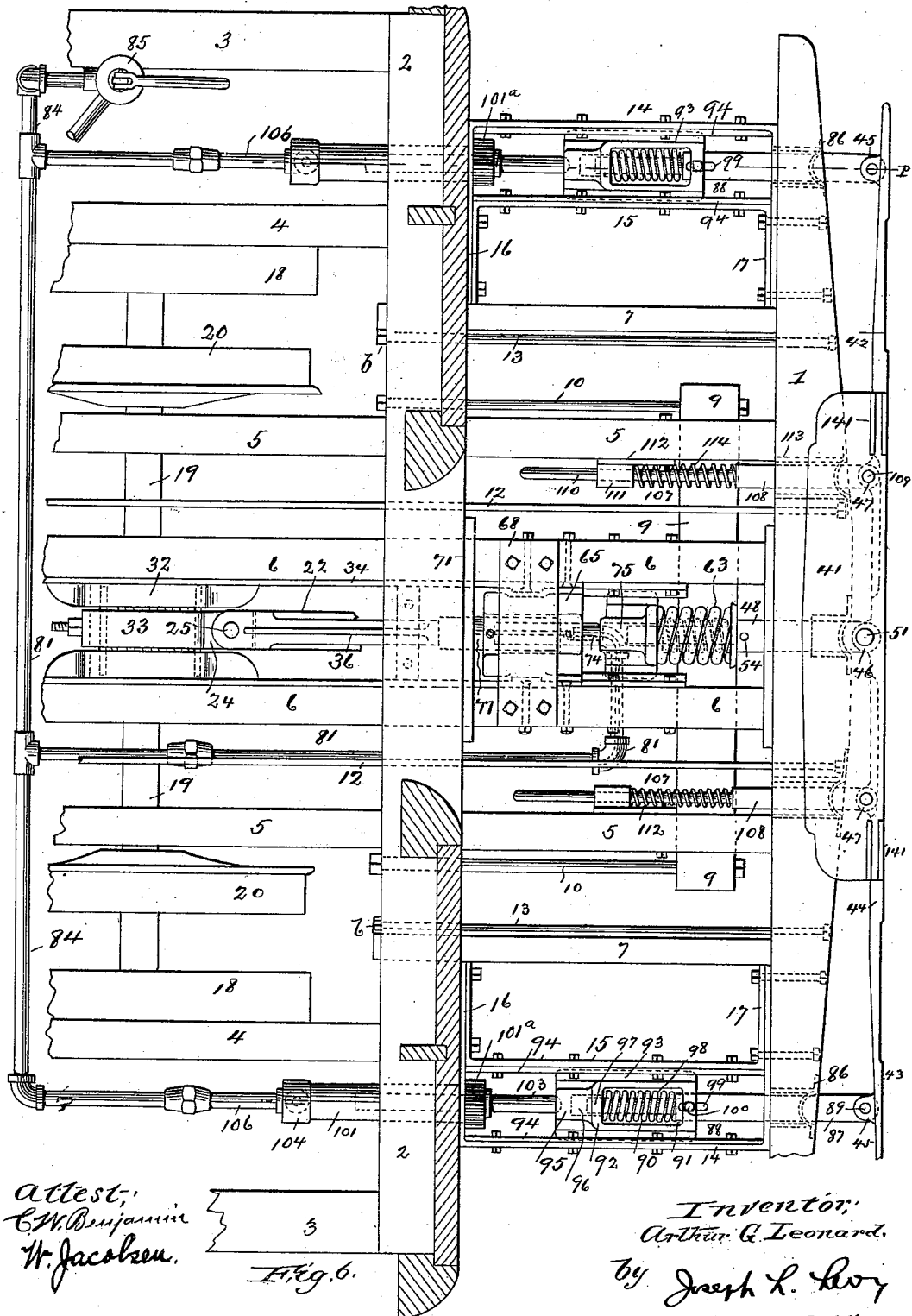

In the drawings forming part of this specification, Figure 1 is a diagrammatic representation of the car-uniting devices of two opposing cars disassociated from the woodwork of the car. Fig. 2 is a like view, the central cylinder for co-operating with the center springs for the friction-plate and the draw-bar being omitted, it showing an operative system embodying the broad features of my invention. Fig. 3 is a plan view of the detached ends of two opposing cars, partly in section, showing the friction-plates thereon in contact and the springs under compression. Fig. 4 is a central longitudinal elevation taken approximately on the line O O, Fig. 3; and Fig. 5, a sectional elevation on the line $p\,p$, Fig. 6, the parts being on the same scale as in that figure. Fig. 6 is a plan view of a detached portion of a car, showing the end of the platform thereof and the construction of the same with the preferred form of my invention attached thereto; Fig. 7, an enlarged plan view of a portion of the car-framing and the central cylinder and connections between it and the friction-plate and the draw-bar. Fig. 8 is a sectional elevation on the line $x\,x$, Fig. 2.

In Figs. 1, 2, 3, and 4 the springs have been placed under compression, as will be hereinafter set forth, and the coils of the springs shown contacted in order to enable them to be illustrated within the space allotted, they in ordinary practice not being completely compressed.

Referring to Fig. 1, I have for the sake of simplicity made in this view a diagrammatic representation of the coupling system and the friction-plate system of two cars wholly disassociated from the woodwork of the car, so that the devices which are used may be clearly seen when they are so separated. As I shall refer to the parts in this figure in a diagrammatic manner, the same numerals of reference are not used as in the views showing the construction. In this view A A' show my two friction-plates. They happen to be illustrated as adapted for a vestibule-car; but these plates may be of any shape which is desired, so long as they are of sufficient length and have sufficient contact surface to enable them to perform the work which is required of them. As shown in this drawing, each friction-plate is carried by three stems $a\,a$ and $a'\,a'$. These stems of course pass through the buffer-beams or rather through suitable openings formed in the buffer-beams. These stems are spring-supported horizontally, the springs being shown at $b\,b\,b$ and at $b'\,b'\,b'$. These springs are in turn abutted against or supported by the rams $c\,c\,c$ and $c'\,c'\,c'$ of the hydraulic cylinders C C C and on the opposite car C' C' C'. The draw-bars and their hooks or portions of them are shown at D and D'. These draw-hooks are so arranged that their shanks terminate and are surrounded by the springs E E', held in the usual form of spring-yoke box or draw-iron, the parts being so arranged that the spring can be used either as a draw-spring or as a buffer-spring. At F and F' are shown plungers or rams of the hydraulic cylinders, which are used in connection with the coupling-hooks D D'. These hydraulic cylinders are, as a matter of convenience, formed in the same casting with the hydraulic cylinders used for the center of the friction-plates C C'; but this is merely one form of construction. The rams F F' of the hydraulic cylinders are shown extending therefrom and as connected directly with the frame connecting the draw-springs E' E by means of the push-bars $f f'$ in such a way that when the rams are pressed backward or toward the middle of the car the draw-springs will be put under compression. At G G' are two tanks, which may be located anywhere within the car-body or under it or in any convenient position. These tanks carry a supply of liquid for the hydraulic cylinders, and may be comparatively small, as the leakage is not great. Pipes connect the tanks with the cylinders under each car, those under one car being marked $g'$ and those under the opposite car being marked $g$. A pump H H' is shown, which may be located anywhere within the car-body where the attendant can get at it, to which a pressure-gage $H^2$ is preferably attached, as before stated. A passage is made between the water-space of the central friction-plate hydraulic cylinder and the water-space of the cylinder below it and used for the coupler-springs, so that this passage-way may be considered as one of the pipes $g g'$ uniting the water-spaces of those two cylinders. This will be detailed farther on.

Let it now be assumed that there is no water in any of the hydraulic cylinders. The cars can be brought together without the shock necessary to set the springs under the old system and the couplers can be united, and in locking themselves together the friction-plates will merely be pressed backward, the force to do this being only sufficient to overcome the friction of the parts in their supports. The attendant now steps onto one of the cars and operates the pump H or H', or two attendants do the same thing simultaneously on both cars. The fluid passes from the tanks G G', through the pipes $g g'$, to the various hydraulic cylinders C' C, which projects the rams $c c'$ and $f f'$, the rams $c c'$ serving to put the springs $b b'$ under compression, while the rams F F' put the draw-bar springs E E' under compression, and this pumping operation is then continued until a sufficient pressure is obtained—in other words, until the springs are sufficiently compressed. When this is accomplished the draw-faces of the couplers are pulling with great force against each other and the abutting faces of the friction-plates are pressing against each other, also with great force. As I have before said, the springs must not be so compressed by the movable abutments as to destroy their capability of operation as springs. The train may now be started. The strain of starting further compresses the draw-bar springs, and in running along the road the cars are held together by the compressed draw-bar springs, which tend all the time to draw the two car-bodies together, which are held apart by the compressed friction-plate springs, (which tend to force the car-bodies apart from one another,) the draw-bar springs and the friction-plate springs operating always in opposition to each other.

It is manifest that if the same amount of compression and the same amount of strength of springs are attempted to be had and the cars are attempted to be coupled by concussion, the compression being given to the springs by that concussion, it will require great force (which will be injurious to the cars and exceedingly annoying to passengers) to force the springs into such a degree of compression as can be attained by a few strokes of my pump. Consequently I have attained an end by this arrangement which is not attainable in practice by the methods now in use. Neither in this connection could I employ the English method, for that method precludes the use of automatic couplers; and it is better practice that automatic couplers be used, so that the cars can be coupled with each other when they have my improved devices upon them.

In Fig. 2 the same system is shown, lettered the same way, but without the plungers F F', for operation upon the draw-bar springs. Also in this illustration the friction-plates are shown as operated upon by two hydraulic cylinders for each car, instead of by three. In this modification I get the benefit of movable abutments for the friction-plate springs; but I do not obtain the benefit of the said abutments for the draw-bar springs, nor for the center stem of the friction-plates, as the drawing shows, although the third hydraulic cylinder might be there used if thought advisable. I merely show this as illustrative of a modification of my invention when disassociated from the coupling mechanism. I may also use my invention for coupling mechanism disassociated from the friction-plate mechanism. In fact, my invention is applicable wherever it is desirable to first couple the cars and then put the springs that control either the draw-bars or the buffer or the friction-plates under compression after coupling has been effected.

I will now proceed to turn to those figures which show the same parts that I have been describing located properly within the woodwork of a car-platform; but I do not need to say that my invention is not in any way limited to the arrangement shown in a car-platform having all the parts shown, the figures merely being illustrative of one of the preferred methods of arranging and locating the parts in a car-body.

I am aware of the fact that the Janney system as used on the Pennsylvania railroad in coupling cars puts the buffers and draw-faces under compression, and I am also aware of the fact that as the train is running these faces, except under unusual conditions, remain under compression as the cars separate, due to the swaying of the engine in one direction and the effort of pulling the rear cars in another direction; but the compression of the springs to accomplish this end can only be obtained in such systems by concussion in the coupling operation, and to diminish this blow to the minimum the compression obtained is not very great. Therefore the buffers of the front cars, which are subjected to the total strain of pulling the train, are apt to separate from each other as the springs find a sufficient range of action to accommodate themselves to the separation of the cars.

With my system, wherein the springs are put under compression after coupling is effected, a sufficient amount of compression can be given to the springs, and the springs themselves can be of sufficient size to allow the greatest amount of separation that ever takes place between the cars in running and still keep the friction-plates firmly in contact, thus sustaining and maintaining the friction between the car-bodies under all conditions, which is a useful result striven for by the system of the Pennsylvania Railroad Company, but not attained under all conditions. In this regard my system is vastly superior to any system wherein the springs are put under compression by the act of coupling the cars.

I shall now describe my invention as embodied herein in detail.

Before proceeding to describe the details of my invention I shall first set forth the construction of the platform of the car and a portion of the car-body itself lying contiguous therewith.

The forward end of the platform is defined by the buffer-beam 1, which in this case, as in the usual practice, is as wide as the car, and at a certain distance to the rear of the buffer-beam lies the front or cross door sill 2. Between the door-sill at both the ends of the car extend longitudinal outer sills 3, and between the cross or door sills at each end of the car extend the inner longitudinal sills 4 5 6; the sills 5 and 6 extending past the door or cross sill to the buffer-beam, to which it is secured in the usual way, and which forms part of the platform-body. Between the door-sill 2 and the buffer-beam extends the step-sill 7, which defines the width of the platform proper. Below the sills 5 6 run additional sills 8, which lie directly below the sills 5 and 6, the one lying directly under the central sill 6 only being shown, and which are illustrated in Fig. 8. The forward ends of each one of these sills abut against or are affixed to a cross-timber 9. As the sills 8 are subjected primarily to the first strain of pulling the car, as well as to the strain of compressing the draw-bar springs, they are braced longitudinally by tie-bolts 10, passing from the cross-timber 9 to the door-sill 2, or extending to the other end of the car to a like cross-timber, as may be desired. Suitable bolts 11 are fixedly secured to the cross-timber 9 and sill 6, (see Fig. 7,) uniting them, and further tie-bolts 12 pass between the buffer-beams at each end of the car, or to a point intermediate thereof, and short tie-rods 13 extend between the buffer-beam and the door-sill. Between the extreme ends of the buffer-beams and the door-sills and outside of the step-sills 7 is located a composite brace or sill composed of angle-plates 14 15, the ends 16 17 of which are turned at right angles and are secured by suitable bolts to the buffer-beam and door-sill, respectively. This composite brace or sill is of double utility, as will be hereinafter pointed out.

To illustrate the relation of the truck-wheels to the rest of the structure, I have shown a portion of the truck-frame at 18, Fig. 6, and between said side frames extend the axle 19, journaled in the axle-boxes in the usual way in the side frames, the axle 19 carrying the truck-wheels 20. The foregoing structure not only serves as a support of the parts hereinafter set forth, but has many novel features which enter into the present invention, all of which will be detailed farther on.

I shall proceed to describe the connection with the coupling devices of means for placing the springs under tension and the means for forcing the friction-plates together, both when independently operated or when all are bound to operate simultaneously.

The rear end of the draw-bar 21 (which in this instance is constructed of two plates 22) is arranged to move in a suitable guideway and against the action of springs in any desirable way, or, preferably, as follows: A housing 23 having forwardly-extending lips 24 is pivotally secured to the plates 22 by means of a pin 25 dropped through the lips 24, and secured to the pin between the plates 22 is an eyebolt 26, the rear of which is provided with a nut 26$^a$ abutting against the back plate 27 of the housing. Two springs 28 29 surround the eyebolt 26 and lie within the housing 23, both springs bearing against the two movable followers 30 31, the ends of which are adapted to move in the guides 32, secured to the longitudinal sills 8, the guides 32 being provided with suitable abutments against which the followers 30 31 strike. The coupling-hook 22 is supported in any desirable way, as by the bracket 33, depending from the beam 9, and its rear support and spring connections can be constructed other than in the way above described and shown without materially affecting the nature of my invention. Its connection, however, with the invention is through the instrumentality of a pivoted push-bar 36, which is forwardly supported by a stirrup 37, depending from the door-sill 38, Fig. 8, which is located to the rear of the door-sill 2, and at the rear it is pivotally secured through the flange 39 to the pin 25. A lug or shoulder 40 on the push-bar engages with the upper lip 24 of the housing, so that the shoulder 40 relieves the bolt 25 of the excess of strain brought thereon. At 34 are reinforce-plates to strengthen the beams at the point of application thereof.

At 41 is shown the sill-plate and depending therefrom and extending outwardly toward the sides of the car is the friction-plate 42, lying in the same plane and in front of the buffer-beam 1, and which is preferably constructed as shown, it having on its outer face the friction-surface 43 and a similar surface 44 in front of the sill-plate and extending a short distance therefrom on both sides. The inside of the friction-plate is provided with several apertured bosses 45 at the ends, 46 (shown in dotted lines, Fig. 6,) at the center, and 47 (shown in dotted lines) between the bosses 45 and 46.

As the structures on both sides of the center of the car are the same, I shall only describe one side.

Through an aperture in the buffer-beam 1 extends the squared end 48 of the side stem 49, the squared end lying in a guide-casting 50 set in the forward end of the buffer-beam, in which lateral play of the bar 49 is permitted, the outer end of the stem lying within an aperture formed within the friction-plate and lug 46 (see Fig. 8) and is provided with an aperture, as is likewise the lug 46, through which extends a coupling-pin 51, the lower end being provided with a suitable pin or cotter 52 to prevent the pin from jumping out. Between the sills 6 and against the inner side of the buffer-beam 1 is an apertured guide-plate 53, against which a pin 54 on the push-rod 48 may strike to arrest its complete outward movement, as the stem 49 as its rear end is not otherwise restrained as to forward movement. The pin 54, however, does not take any of the force of compression of the springs. The rear end of the stem 49 is rounded and is supported in a cylindrical guideway 55 formed in a cross-head 56, the forward end of which is provided with an annular lug 57 and at the sides with ears 58, which work in the guideways 59 formed on the plate 60, secured in place to the sills 6 by bolts 61, as shown in Fig. 7. Against the shoulder formed at the intersection of the rounded and squared portions of the stem 49 lies a spring plate or cap 62, cast to receive one end of a spiral spring 63, which encircles the rounded portion of the stem 49, and within the spring 63 and about the stem 49 lies an auxiliary spring 64. Both springs abut against the annular lug 57 on the cross-head 56. A duplex cylinder 65 is supported in position between the sills 6 and 8 by means of the straps or cross-bars 67 68 above and below the cylinder, and being united together by the bolts 69 and 70, which serve also to hold the sills 6 and 8 together, (as do the bolts $a$ and $b$.) The rear of the cylinder 65 abuts against a plate 71, which in turn lies up against the cross-sills 2. The upper portion of the cylinder is provided with a cylindrical chamber 73, in which is adapted to work a ram or plunger 74, the forward end of which abuts against the barrel 75 of the cross-head 56. Below the chamber 73 is another chamber 76, in which is adapted to work a suitable ram or plunger 77, the rear end of the plunger engaging with the forward end of the push-bar 36. The chamber 73 and plunger 74 are both smaller in diameter than the chamber 76 and plunger 77; but this need not of necessity be so, and both plungers are provided with suitable packing if desired. The chambers 73 76 have a communicating-channel 78 formed in the cylinder 65, from which lead ports 79 80 into the chambers 73 76, respectively, and opposite the port 80 is a tapped hole into which a pipe 81 enters. In Fig. 8 there is shown three plugs plugging up the ends of the channel 80. This simply illustrates the method of making the channel and ports in the cylinder, they having been drilled instead of being formed by casting. The sides of the cylinder 68 are recessed, as shown in dotted lines at 82, Fig. 7, within which extends a shoulder 83, also shown in dotted lines in Fig. 7, said shoulder being formed on a plate 84, secured alike to the upper and lower sills 6 and 8, the engagement of the shoulder 83 with the recess 82 further securing the cylinder against longitudinal movement in either direction. The pipe 81 leads from suitable connections 84 to a force-pump 85, supported in the car and of any desired construction, and which is connected with a tank $85^a$, as before described. (See Fig. 3, to which is connected a gage $H^2$, Fig. 2.)

When the springs about the friction-plate "center stem," (as it will now be called) and at the end of the draw-bar are not under compression and the cars uncoupled, the friction-plate extends out where the movement of uncoupling had left it, and the draw-bar with its coupling-hook has been moved to its position of rest by its springs—that is, the face-plate may have been moved away from the buffer-beam forwardly and the face of the coupling-hook will occupy a plane vertically forward of the friction-plate. These positions of the face-plate and the draw-bar are the normal positions—that is, at the time that their springs are not compressed. When two cars are brought together by coupling, however, in the structures in use at the present time, both the coupler and buffer springs receive the shock, whereas in my construction the coupling-hooks and then the springs of the coupler receive and absorb the shock due to coupling without affecting the friction-plate springs.

When the cars are coupled the force-pump 85 is operated, which will move a column of water through the pipe 84, thence to the pipe 81 and into the channel 78 of the duplex cylinder, forcing out the plungers 74 77, the plunger 77 moving the push-rod 36 and housing 23 against the follower 31, which will first compress the nest of springs within the housing, (the coupling of the cars not having primarily compressed the springs,) which will move the follower 30 against the rear abutment in the guide 32 at the same time, the plunger 74, which bears against the barrel 75 of the cross-head 56, bringing the cross-head against the nest of springs 63 64, moving the center stem 49 through the spring-plate 62 and forcing out the friction-plate 42, which, when it meets the opposing friction-plates on the next car, enables the springs to be compressed, the conjoint operation being such as to cause the friction-plate of one car to push the opposing car away from it, the rearward movement of the draw-bar by the simultaneous movement of the plunger 77 and its connections to the draw-bar meanwhile pulling the opposing car toward it, which will firmly couple and unite both of the cars together and frictionally contact the friction-plates throughout their entire area of exposed surface. This conjoint operation belongs to one part of my invention, and should not be confounded with that part which employs either the movable abutments or rams at the ends of the friction-plates alone, or when such rams are used in conjunction with an additional ram within the same for compressing the center-stem spring alone without the draw-bar and circuit, so to speak, and operated primarily and simultaneously by one force-pump; or when such end rams are used in conjunction with the duplex cylinder for conjointly operating the face-plate center stem and the draw-bar, or when a single ram is used for either the spring of the friction-plate center stem or the draw-bar for springs.

I shall now describe the devices connected with the ends of the friction-plate.

Through suitable guideways 86, secured in apertures in the end of the buffer-beam, are adapted to move the squared shanks 87 of the friction-plate side stems 88, the forward end of the rods being secured within the lugs 45 by the pins 89. From the shank of the stem extends a round bar 90, the union of the shank and bar forming the shoulder 91. The rear end of the stem and its bar lie within a cross-head 92, which cross-head has ears 93, enabling the cross-head to move in a guideway formed by the bars or plates 94, secured alike to the inner side of the longitudinal members 14 15 of the composite sill. The barrel 95 of the cross-head has an aperture 96, within which the bar 90 is adapted to play and which forms a guide for it, the guide being wider than the stem to allow of sufficient lateral play. The barrel of the cross-head has an annular plate 97, against which one end of a spiral spring 98 bears and which encircles the stem 90, the other end of the spring bearing against the shoulder 91. The rear portion of the shank 87 is provided with a slot 99, and a pin 100 passes through the barrel of the cross-head and through the slot so as to hold the friction-plate side stems within the cross-head, and at the same time permit a movement between them and their springs. A cylinder 101, secured in any desirable manner to the door-sill 2 or any other convenient place, (as by the nut 101ª,) has a chamber 102, within which is adapted to work the ram or plunger 103. The rear end of the cylinder has for economy of manufacture a cap 104 and a lug 105 thereon, from which leads a branch pipe 106 and suitable connections to the main service-pipe 84. As the construction on both sides of the car are identical I have only described one.

The foregoing suffices for an operative structure; but the following may be used, if desired, and I prefer to use the same.

Two equalizing-bars 107, the shanks 108 of which are squared, are secured by pins 109 within the apertured lug 47 of the friction-plate, the rounded stems 110 being movably supported in a collar 111 cast on a plate 112, which plates are secured to the sills 5. The squared shank passes through guide-plates 113, affixed in apertures in the buffer-beam in the same way as the friction-plate stems. Spiral springs 114 encircle the stems 110 of the equalizing-bars and abut at one end against the collars 111 and at the other end against the shoulder formed by the union of the shank 108 and the stems 110. The use of these springs is well understood in the art.

The manipulation of the friction-plate by the side rows or abutments conjointly with that of the central ram and also with that of the ram for operating the draw-bar will now be described.

The cars being coupled without compression of the friction-plate springs, as before described, the pump 85 is operated and through well-known laws pressure is created back of the rams in both the side cylinders, which contacts the friction-plate with the opposing plate, primarily compressing the springs of the friction-plate first moved. This compresses the friction-plate springs on the opposing car, if the first-moved plate is likewise opposed, and the pressure will bring the friction-plates together, contacting them with great force. It will thus be seen that I can use the rams for forcing out the friction-plate independently of the conjoint operation therewith of the draw-bar, for this only necessitates cutting out the central cylinder, for which purpose I can provide the pipe 81 with a valve 115 in Fig. 7, cutting this cylinder out of the "circuit," so called, in which case the side rams would be used to work the friction-plate, the central stem 49 being used merely as a pivotal support for the center of the friction-plate, which can be backed up by springs in the usual way and is capable of movement like the side stems, as illustrated diagrammatically in Fig. 2. The three rams communicating with the friction-plate operate to force out the friction-plate equally—that is, at the ends and at the center—and simultaneously with the projection of the face-plate the drawbar is moved rearwardly, so as to operate to move the opposing car toward it under great pressure, all the springs being compressed to maintain this pressure. Therefore it will be clearly seen that when the same operation is performed in either one of the ways described on the two opposing cars the friction-plates will be held together under great pressure, so that the contact of the plates is of such a nature that it can be said that it introduces into the support of the car an auxiliary truck, the great frictional contact between the opposing plates being such that the amount of drop or action on the track that the truck can have will be far in excess of the movement in a vertical plane of the face-plates upon each other. This pressure I have determined by actual successful trials to be operative to obtain all the advantages hereinabove described and eliminate all the objections incidental to the use of other structures to be about five hundred pounds to the square inch.

By reference to Figs. 4 and 8 it will be seen that the chamber in which the ram 77 is located is much larger than the chamber 73, in which the ram 74 moves. This may not of necessity be so; but the reason why I have constructed the device in this manner is because I desire to prevent the pull of the draw-bar while the train is in motion from displacing too much water in the chamber of the plunger 77. This, however, can be left to the desire of the constructer. With the cars connected in this way and the train being in motion each car necessarily radiates to accommodate itself to the curves. A column of water lying in the circuit behind the rams, which includes all of the ram-chambers of the projecting devices, acts as a flexible lever or movable abutment for maintaining the springs under compression, which is rigid, in that it does not give to the release of the springs, the united friction-plates operating to keep the cars together under great pressure, and when on a curve they can assume a position radial to the curve on which the cars are working by moving on each other without destroying their contact. The guideways in which the friction-plate stems are adapted to move being wider transversely than the width of the stems themselves permit of a movement therein, the friction-plate vibrating centrally upon the pin 51 and at the ends on the side stems, causing the pins 100 to move in the slots 99, moving the cross-heads against the opposition of the springs against the movable abutment or ram, it moving the column of water, and displacing the ram in the other side cylinder, the apertures 96 in the cross-heads permitting a longitudinal movement of the side stems as well as a pivotal movement on the pins 89.

The springs 114, surrounding the stems of the equalizing-bars 117, are simply used for the purpose of keeping the friction-plate in a right line in front of the platform when the opposing friction-plate is not contacted and play no more important part in the operation of this device other than that just before set forth.

The union of the cars and of each car of the train when made, as before described, in any one of the particular ways entirely or substantially eliminates the end oscillation (or that in the direction of the length of the car) and also the side or transverse oscillation, the end oscillation being eliminated by the almost rigid union through the friction-plates of each car with its opposing car, the side or transverse oscillation being eliminated, primarily, through the great frictional contact of the plates, which is augmented by the increase in their extent of frictional surface and leverage.

I do not mean when I say "extent of frictional surface" that I have merely increased the area of the frictional surface on the friction-plate, as the same may be provided with a projecting frictional surface 43 44, located at the ends and at the center of the face-plate, and the area of these surfaces may not exceed that of the usual buffer-plates; but I mean that I accomplish the desired results through the increase in the leverage of the friction-plates, which results in an increase of the extent of the contact-surfaces.

It is well known in railway practice that each car sets up, when in transit, motions independent of the other, and as to the side oscillation, each opposing car will have a movement transversely of the track in opposite directions—that is, one car will sway toward one side and the other car sways toward the other side. It may also happen that both the cars will sway in the same direction at the same time; but as the end trucks of the opposing cars do not generally strike the same inequalities in the road at the same time the contrary or opposite motion is present to a greater extent, and in fact preponderates entirely. This contrary motion is entirely checked by my invention by reason of the cars being held together under great pressure at a point close to the outer end of oscillation of the car.

I have stated that among other things an admirable feature of my preferred and illustrated structure lies in extending the friction-plates out beyond the tread or flange of the wheel. This I consider to be as concise and as clear a statement as I can make, and I think it is correct, for the reason that the oscillation of the car generally takes place from an imaginary point somewhere within the truck-frame, and that the flanges of the wheels resist the tendency which the oscillation of the car may have to throw the truck from the track, and thus keep that point within the track-gage. Thus it will be seen that there is a certain co-operative relationship between the frictional surfaces at the outer ends of the friction-plates and the contact of the flange of the wheel on the track. Whatever correctness there may be in this statement, it is nevertheless true that this relation of parts is admirably efficient in almost entirely eliminating the side oscillation of the car.

It will be seen that with my invention many new and novel results can be accomplished. I am aware of the fact that earlier inventors have proposed to use air-pressure in the cylinders at the ends of cars to act as springs, and that it has been suggested to use water to move buffers, the water coming from the engine or a tank thereon. The first of the systems would involve the use of the air from the train-pipe of the air-brake, introducing a serious source of danger, as a disablement of any one of the buffer systems so shown would in the modern air-brake throw the piston of the triple valve into the emergency division and the train would be stopped with great violence, and as a consequence the cars would be seriously racked, and the air-brake system would be possibly seriously disabled. In any system involving water-pressure from the engine such system would also involve flexible couplings between the cars, and as all cars have two of these on at the present time the addition of two more at each end of the car would be wholly impracticable.

With my invention the system at each end of the car is independent of the system at the other end of the car, so that the loss of pressure in one system does not affect any other system, and the loss of pressure in one system can be made up for and the pressure restored in that system without affecting any other system, and though this could be accomplished by the use of one reservoir and one pump on each car the pump being capable of delivering liquids into the system at either end of the car at will, my preferred arrangement is one wherein two reservoirs are used and two pumps still further individualize the systems and save the complications of pipes underneath the car-body.

At the present time so many pipes are placed under the car-body that it would be highly advantageous to dispense with any additional ones if this could be accomplished.

It is desirable to have the pressure in the system of two coupled and adjoining cars approximately the same, so that the friction-plates and draw-bar faces will remain central, thus placing my springs in the best position for work. This I can accomplish, though one system may leak more than the other system, because I can pump up the leaky system oftener than the tighter system, and in this way I can accomplish the same result as though all my systems were under pressure from a common source; but I do it without the impractical methods of connecting the various systems of the various cars by hose-coupling and I likewise save train-pipes for connecting the systems on individual cars. I consider it an important feature of my invention that the two individual systems on each car-body are wholly independent from the other systems on the other car-bodies, and that my individual systems on each car-body are each capable of being individually supplied with water or its equivalent under pressure by a person upon said car-body, so that as the train is in motion the porters or brakemen can have full control in each car of the pressure in each individual system.

It is obvious that my invention can be carried out in any of its forms by devices differing structurally from those shown and described, and therefore I do not limit myself to such construction.

I therefore claim as my invention and desire to secure by Letters Patent—

1. In combination with a car and its platform, of a friction plate having stems movable in the platform, a tank on the car for containing inelastic liquid, a pump on the car for taking the liquid from the tank and moving it under pressure, means for determining the pressure, a pipe system connected with said pump, a plurality of cylinders in connection with said pipe system provided with plungers in line with said stems, a spring co-operating with each of the plungers and stems, the hydraulic pressure operating to project the friction plate, compress the springs and maintain them under compression during the evolutions of the friction plate, substantially as described.

2. In combination with a car body, a friction plate thereon, a tank for containing a supply of an inelastic liquid located on the car, a draw bar, hydraulic cylinders connecting with the draw bar and friction plate, rams in the cylinders, springs interposed between the rams and the draw bar and friction plate, a pipe system connecting the cylinders with forcing means adapted to force the liquid from the tank upon the car body into the pipe system, and cylinders to operate the rams, said forcing means being carried by the car body and operative therefrom, substantially as described.

3. The combination with the frame of the car body and a friction plate in front of the platforms at each end of the car, and means for movably supporting the friction plates upon said platforms, of a tank carried by the car body, and a pump located at or near each end of the car and adapted to force an inelastic liquid from the tank, separate and independent pipe systems on each end of the car body to receive said liquid under pressure, a plurality of hydraulic cylinders secured to the car at each end thereof communicating with said pipe systems, the cylinders at each end being connected, rams in the cylinders operating in connection with the friction plate to project the same, and springs interposed between the plate and the rams, and means for determining the pressure applied to the springs at one end of the car independently of the other, whereby the pressure in the individual systems at the two ends of the car is made independently-regulable, substantially as described.

4. The combination of a car body with two reservoirs for water or the like, one at each end of the car, a pump in connection with each reservoir, friction plates lying transversely of the car platforms at each end, springs for backing up said friction plates, plungers for operating the springs, hydraulic cylinders secured to the car at the platforms, two systems of piping, each system forming a direct communication from the pump and reservoir to the cylinders at its respective car end, whereby each system is made independent of the other, substantially as described.

5. In a car uniting device, the combination with the platform beams, of the friction plate, the coupling hook and its draw bar, springs for resisting the forward and rearward movement of the draw bar, springs for resisting the inward movement of the friction plate, an independently movable abutment located between the draw bar and friction plate springs, and means for simultaneously operating the abutment for moving the draw bar and friction plate in opposite directions, compressing their springs, and maintaining the springs compressed, substantially as described.

6. The combination, in a device for uniting cars, of a coupler, springs for the coupler, a friction plate and springs for the same, movable abutments for the friction plate and coupler springs, and means for moving the abutments and compressing the springs, said means being independent of the coupling, buffing, or drawing action of the device to press outwardly on the friction plate and inwardly on the coupler, substantially as described.

7. The combination of a friction plate and coupler and their respective springs, with hydraulic cylinders, the rams of which form movable abutments for the springs of both the friction plate and coupler in the system, whereby said plate and coupler may be simultaneously moved in opposite directions, substantially as described.

8. The combination with the coupler, friction plate, its stems and springs, of abutments controlled by hydraulic cylinders and arranged to act simultaneously on the coupler and stems, a pump, tank, and a sealed circuit connecting the cylinders, substantially as described.

9. The combination with the friction plate supported upon the platform of a car, of the devices at both ends of the plate for projecting it and maintaining it in a projected position, devices adapted to operate the center of the said plate in a like manner, all of said devices being connected with a primary source of power whereby they can perform their several functions simultaneously, said primary source of power comprising a tank for containing an inelastic liquid, a pump, and connections from said pump and tank to said devices for operating them through the instrumentality of said inelastic liquid under pressure substantially as described.

10. The combination of a car platform, with a continuous friction plate, a plurality of stems extending therefrom at opposite sides of the center of the plate, springs acting on said stems, and a rigid abutment to press against the springs of each stem, said abutment being adapted to primarily compress said springs and to follow the fore and aft movements of said stems and springs correspondingly, and a device localized on the car on which the said plate is mounted for operating said abutments, said device comprising a tank, a pump, a liquid, and pipes connecting the pump with said abutments, substantially as described.

11. The combination of a car platform, with a friction plate, stems connected with said plate near its outer ends, springs connected with said stems, a draw bar, a spring connected therewith, and a rigid abutment arranged to compress the springs connected with said stems and draw bar and to follow the movements of said stems and draw bar correspondingly, as well as to retract the draw bar simultaneously with the compression of the springs on said stems, substantially as described.

12. The combination of a platform, with a friction plate, a central stem pivotally connected therewith, a spring acting on said stem, other stems pivotally connected with said plate near its ends, a draw bar, a spring acting thereon, and a movable rigid abutment connected with and acting on said stems and on the draw bar, and arranged to compress said springs and advance said stems while simultaneously acting to retract said draw bar, said abutment being further arranged to follow the movements of said stems and to keep a rigid abutment against the springs in the several positions assumed as well as to keep a rigid abutment against the draft of the draw bar, as and for the purposes specified.

13. The combination of a platform, with a friction plate, stems extending from said plate near its ends, springs acting on said stems, plungers or rams acting on said springs, sealed cylinders in which said plungers or rams work, a sealed pipe connecting said cylinders, and a column of inelastic liquid in said pipe and cylinders, and means comprising a tank, force pump and visual gage localized as to each plate and independent of the others of the train for creating pressure on said fluid to move said plungers or rams to compress said springs, the parts being so arranged that the movement of one stem will correspondingly move said column of liquid and thus retain a rigid abutment behind the stems in their several positions, substantially as described.

14. The combination with the buffer beam, of a friction plate, a stem pivoted to the plate and movable in the beam, a spring acting on the stem, a plunger or ram acting on said spring, a sealed cylinder for said plunger or ram, a column of non-compressible fluid under pressure in said cylinder to act on said plunger or ram, and a tank, force pump, and visual gage all local to the car on which said plate is located, and independent of any other source of supply and pressure, as and for the purpose specified.

15. The combination of a platform, with a friction plate, a stem extending therefrom, a spring acting on said stem, a plunger or ram acting on said spring, a cylinder receiving said plunger or ram, another cylinder, a passageway between said cylinders, a plunger or ram in the second mentioned cylinder, and a draw bar connected with the second mentioned plunger or ram, and means for maintaining a column of non-compressible fluid under pressure in said cylinders and in the passageway, as and for the purpose specified.

16. The combination of a platform, with a friction plate, a stem extending therefrom, a spring acting on said stem, a plunger or ram acting on said spring, a cylinder for said plunger or ram, another cylinder, said cylinders being made in a single piece of metal and having openings extending in opposite directions, a passageway in said piece of metal leading to said cylinders, a plunger or ram in the second mentioned cylinder and connected to a draw bar, and means for maintaining a column or body of non-compressible fluid under pressure in said cylinders and passageway, as and for the purpose specified.

17. The combination of a platform, with a friction plate, a stem extended therefrom, a cross head, and guides on the platform for said cross head, said cross head receiving said stem, a spring between said cross head and an abutment on said stem forward of the cross head, a plunger or ram engaging the rear of said cross head, a cylinder for said ram, and locally controlled means for maintaining a liquid pressure against said plunger or ram, as and for the purpose specified.

18. The combination of a platform and its buffer beam, with a friction plate, a stem pivotally carried thereby and guided by said beam, a spring surrounding said stem, an abutment in front of the spring on said stem against which said spring presses, a cross head to the rear of the spring having a recess to receive said stem and against which cross head said spring acts, a guide on the platform for the cross head, a ram bearing against the rear of the cross head, a cylinder for the ram, and locally controlled means for moving said ram and cross head forward to compress the spring against a resistance applied to the friction plate, said means comprising a local tank, force pump, and a non-compressible fluid, as and for the purpose specified.

19. The combination of a longitudinally movable draw bar, with a cylinder, and a rearwardly and independently movable plunger or ram, a push bar connecting the ram and bar, springs connected with the rear of said draw bar to be compressed by the ram and resist the forward movement of the bar, abutments for said springs, and a hydraulic device for placing a body of liquid under pressure in the cylinder to coact with said plunger or ram to form a rigid abutment for the draw bar, as and for the purpose specified.

20. The combination of a draw bar, a housing carried thereby, a spring in said housing, and abutments to resist said spring, with a push bar connected with said draw bar, and a hydraulic device to co-operate with said push bar, as and for the purpose specified.

21. The combination of a draw bar, a housing connected therewith and having a lip 24, a spring in said housing, and abutments for said spring, with a push bar carried by said draw bar and having a shoulder 40 to rest against said lip, and a hydraulic device to co-operate with said push bar, as and for the purpose specified.

22. The combination of a draw bar and its spring, with a push bar pivotally connected with said draw bar, and a hydraulic device to co-operate with said push bar, substantially as and for the purpose specified.

23. The combination of a casing having double cylinders directly connected and superposed one above the other, rams or plungers movable in opposite directions in said cylinders, a draw bar connected with the lower and rearwardly moving ram, a friction plate connected with the other ram, and means for maintaining fluid under pressure behind said rams, substantially as described.

24. The combination of a casing having double cylinders directly connected, movable rams or plungers of unequal sizes and movable in opposite directions, a draw bar connected with the larger of the rams, a friction plate connected with the other ram, and devices for maintaining fluid under pressure behind said rams, substantially as described.

25. The combination of a platform and a friction plate, with a stem extending from said plate, said stem having a slot, a cross head receiving said stem, a pin in said cross head passing through the slot in said stem, a spring on said stem, and a movable abutment to bear against and compress said spring, substantially as described.

26. The combination with the platform and buffer beam, of the friction plate, a stem secured thereto and movable in the beam, a spring cap on the stem, a spring on the stem to the rear of the cap, an apertured cross head at the rear of the spring in which said stem has longitudinal play, guides on the platform for said cross head, a ram at the rear of the cross head, a cylinder for the ram, and means for maintaining fluid under pressure behind the ram, whereby said spring can be compressed without necessitating a projection of the stem and friction plate, substantially as described.

27. The combination with the platform and its buffer beam, of the friction plate, a stem pivotally secured to the plate and movable in said beam, a slot in said stem, an apertured cross head, guides on the platform for the cross head, a spring on said stem confined within the cross head, a pin passing through the cross head and slot in the stem, a ram at the rear of the cross head, a cylinder for the ram, and a hydraulic device co-operating with said ram, substantially as described.

28. The combination with the platform and its buffer beam, of the continuous friction plate, a central stem pivoted to said plate and movable in said beam, side stems likewise connected, a slot in each of the side stems, apertured cross heads in which the side stems work, a spring on the side stems confined within the cross heads, guides on the platform at each side of the central stem for the cross heads, a pin passing through each cross head and slot in the side stems, rams at the rear of the cross heads, cylinders for the rams, a pipe connecting both cylinders, and a hydraulic device co-operating through said pipe with the rams, substantially as described.

29. The combination with the platform, its buffer beam and door sill, of the friction plate, a stem supporting the friction plate in the buffer beam, a cylinder secured in the door sill, a plunger movable therein, bracing guides extending between the buffer beam and the door sill near the side of the platform, a cross head movable in the guide receiving the end of the stem, and a spring about the stem within the cross head, the plunger engaging said cross head, and means for moving the plunger, substantially as described.

30. The combination with the platform, its buffer beam and door sill, of the friction plate and its stem, a cross head, a spring about the stem in the cross head, guides for the cross head comprising plates having bent ends which are secured respectively to the buffer beam and door sill, a cylinder and plunger to move the cross head, and means for operating the plunger, substantially as described.

Signed in the city, county, and State of New York this 7th day of July, 1893.

ARTHUR G. LEONARD.

Witnesses:
JOSEPH L. LEVY,
B. S. WISE.